United States Patent Office 3,519,602
Patented July 7, 1970

3,519,602
EPOXY RESIN COMPOSITIONS COMPRISING AN EPOXY RESIN AND N-SECONDARY-ALKYL POLYALKYLENE DIAMINE
Anthony J. Castro, Oak Park, Layton F. Kinney, Evanston, and Wayne R. Coy, Cicero, Ill., assignors, by mesne assignments, to Armour Industrial Chemical Company, a corporation of Delaware
No Drawing. Filed Sept. 13, 1967, Ser. No. 667,340
Int. Cl. C08g 30/14
U.S. Cl. 260—47  9 Claims

ABSTRACT OF THE DISCLOSURE

Epoxy resin compositions comprising an epoxy resin and an N-secondary-alkyl polyalkylene diamine to form resin compositions useful for coatings, castings and the like.

BACKGROUND OF INVENTION

It has been known heretofore that epoxy resins can be cured with certain diamine curing agents to form solid resinous materials. However, it is generally known that poor surfaces are produced when epoxy resins are mixed with amine curing agents and applied soon after mixing. Cured coatings are generally dull and opaque when N-normal-alkyl trimethylene diamines are utilized as curing agents. Further, the straight chain diamine curing agents cannot be applied soon after mixing, but require up to several hours "sweat-in" period prior to application of coating and even then exhibit very poor characteristics. Additionally, some of the higher straight chain polyalkylene diamines are not compatible with many epoxy resins.

SUMMARY OF INVENTION

It is an object of this invention to provide cured epoxy coatings which are flexible, clear and glossy. It is a further object to provide epoxy compositions which may be used shortly after mixing, thereby practically eliminating the "sweat-in" period. It is still another object of this invention to provide novel coating compositions comprising an epoxy resin and a branched chain diamine curing agent wherein the curing agent is compatible with a large number of epoxy resins suitable as components of the composition.

The above objects, and others which will become obvious upon reading of the specification and examples, are achieved by use of a composition comprising an epoxy resin and a diamine having the formula

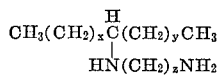

wherein $x$ and $y$ are integers having a sum of from about 3 to 19, and $z$ is an integer from 2 to 4. In one preferred subclass of the above diamines, the sum of $x$ and $y$ is from about 6 to 12 and $x$ is 3.

The N-secondary-alkyl diamines useful in the compositions of this invention can be produced by amidation of olefins in the presence of hydrogen fluoride, followed by conversion of the amide to an amine, cyanoalkylation of the amine and hydrogenation of the nitrile group to yield the diamines useful in this invention. A preferred method of production of these compounds is described in copending application Ser. No. 422,504, filed Dec. 31, 1964, now U.S. Pat. 3,398,196, entitled "N-Secondary-Alkyl Diamine Compounds." The diamines thus formed are an isomeric composition with respect to attachment of the nitrogen to the aliphatic chain and of mixed chain lengths reflecting the particular cut of olefinic reactant utilized. The above formula illustrates the isomeric nature of the diamines.

Suitable commercially available diamines include

N-secondary-alkyl($C_{7-9}$)trimethylene diamine,
N-secondary-alkyl($C_{9-10}$)trimethylene diamine,
N-secondary-alkyl($C_{11-14}$)trimethylene diamine,
N-secondary-alkyl($C_{15-20}$)trimethylene diamine.

An especially preferred amine as a component of our composition is N-secondary-alkyl($C_{11-14}$)trimethylene diamine. Mixtures of diamines may be used.

Epoxy resins suitable for use in the compositions of this invention include a large number of both liquid and solid epoxy resins which are reaction products of polyhydric phenols with polyfunctional halohydrins and/or glycerol dichlorohydrin. These epoxy resins may be generally described as containing terminal 1,2-epoxide groups. A further generally used characterization of epoxy resins refers to their epoxy equivalent weight. The epoxy equivalent weight is the number of grams of 1 gram-equivalent of epoxide. The epoxy resins useful in this invention are those having an epoxy equivalent weight of from about 100 to 2000, the preferred epoxy equivalent weight being from about 120 to 650.

Illustrative of epoxy resins useful in the composition of this invention are the reaction product of epichlorohydrin and 2,2-bis(p-hydroxyphenyl)propane [bisphenol A]; the reaction product of epichlorohydrin and bis(tetrahydroxyphenyl)sulfone; the glycidyl ester reaction product of epichlorohydrin with polymeric fatty acids; epoxy novolac resins obtained by the reaction of epichlorohydrin with the condensation product of phenol with an aldehyde; glycidyl ethers of tetraphenols; glycidyl ethers of polyalkylene glycols; and the epoxidized olefins. Although epichlorohydrin has been used as exemplary in the above epoxy resins, it is understood that other polyfunctional halohydrins may be used. A mixture of epoxy resins may be used.

A large number of commercially available epoxy resins may be utilized in the compositions of our invention. Both solid and liquid epoxy resins are suitable.

The compositions of this invention may also contain solvents such as xylene, toluene, butyl alcohol, Cellosolve acetate; other amine catalysts such as 2,4,6-tri(dimethylamino)phenol; flow control agents such as silicone resins and xylol; pigments, etc., as long as the amine-epoxy reaction is not seriously hindered.

The amount of N-secondary-alkyl diamines used in the compositions of our invention may vary from the stoichiometric amount for reaction with the epoxy by about plus or minus 5% without greatly changing properties of the composition, and may vary as much as plus or minus 15% to result in useable epoxy compositions. The stoichiometric amount of diamine for reaction with the epoxy resin is generally expressed as one epoxy amine equivalent weight per epoxy equivalent weight. Epoxy amine equivalent weight is a term known to the art as the number of grams of amine containing one amine hydrogen. Epoxy equivalent weight has been defined above. The N-secondary-alkyl diamine is generally used in an amount sufficient to cure the epoxy resin to the desired extent, which may be expressed as plus or minus 15% of one epoxy amine equivalent weight per epoxy equivalent weight.

One hundred percent solids systems and solvent based compositions may be formulated according to our invention. The compositions of our invention may be easily formulated without the need of special equipment by methods well known in the art. The diamine may be added at room temperature to the epoxy resin, which may contain solvents or other desired additives, with stirring until homogeneous. The composition may then be used, or if necessary to obtain good flow properties for coating applications, it may be desired to permit the composition to sit for a short time prior to application. If shorter times are desired for curing, the system can be baked at 250° to 400° F. for short periods of time, from about 5 minutes to 45 minutes. When a solvent system is utilized, the solvent should be permitted to evaporate prior to heating to prevent bubbles in the cured material. The time for obtaining a desired cure can be from several minutes to several hours.

The above described compositions result in a cured composition comprising the reaction product of an epoxy resin having terminal epoxide groups

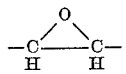

and an epoxy equivalent weight of from about 100 to 2000 and a diamine having the formula

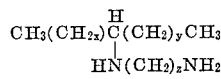

wherein $x$ and $y$ are integers having a sum of from about 3 to 19 and $z$ is an integer from 2 to 4, the amount of diamine being sufficient to react with the epoxy resin to form a hard product. Such cured products are excellent castings and clear, glossy, flexible coatings.

The following examples are presented to further illustrate the present invention.

Example I

Coating compositions were formulated by dissolving 100 grams of a solid epoxy resin having a melting point of 65–75° C., an epoxy equivalent of 425–455, viscosity 40% in butyl carbitol Gardner-Holdt "D" to "G," average molecular weight about 900 (Epon 1001, Shell Chemical Company) in 35 grams Cellosolve acetate and 33.3 grams of xylene. Two grams of a 100% silicone resin flow control agent having a viscosity at 20° C. of 5–30 centipoises 60% in xylol (SR–82, General Electric Company) were added. A stoichiometric amount of diamine noted in Table I was added to the epoxy-solvent composition and stirred until homogeneous. The formulations had a Gardner-Holdt viscosity of "G" to "H." The pot life of these formulations at room temperature was 8 to 12 hours. The non-volatile material content of the formulations was between 60 and 67%.

Each of the formulations was applied immediately following mixing to glass plates, 0.010 standard electrolytic tin plate test panels, and 22 gauge steel panels. Compositions containing the straight chain diamines had poor flow characteristics when being applied, exhibited blush in 80% humidity and 72° F. temperature, and when dried had a hazy, opaque appearance. The compositions containing secondary-alkyl diamines exhibited good flow characteristics, did not exhibit any blush, and when cured were clear and exhibited a glossy surface.

Each coating lacquer dried in 20 minutes. Each coating was baked 15 minutes at 360° F. and then allowed time to cool.

Pencil hardness tests were performed as described by the standards of the Houston Society for Paint Technology, volume 38, No. 502, November 1966.

Rocker hardness, Sward, tests were performed on the coating on glass panels at 24 hours and 1 week after application. The instrument for measuring rocker hardness consists of two 4″ parallel metal rings which rock back and forth on the test panel surface at the end of a pendulum. The pendulum action is initiated and the number of oscillations between two magnitudes of pendulum swing are noted and recorded as the Sward hardness. The standard is 100 for a polished glass surface. The number of oscillations is a measurement of the hardness and surface properties of the test film.

A ⅛″ mandrel test was performed on each of the coatings on 22 gauge steel panels as described by ASTM test procedure D–1737–62, Book No. 21, 1964 edition.

Reverse impact tests were performed on each coating on tin plate using a variable impact tester. The impact tester has a weighted rod with a ⅝″ diameter hardened steel round nose punch attached to the lower end. The punch is raised to the desired point on a calibrated scale indicating inch pounds of impact and then dropped, causing impact of the punch with the test panel which is located over a ⅝″ hole in the base plate. The test panel is then examined for flaking and cracking.

A puddle of methylisobutyl ketone was placed on each coating and no effect was observed in 30 minutes.

The results of these tests are shown in Table I.

Example II

A coating was formulated using 100 grams of Epon 1001, 33.3 grams xylene, 25 grams methylisobutyl ketone, 25 grams toluene, 1 gram SR–82 flow control agent, and 3 grams 2,4,6 - tri(dimethylamino)phenol (DMP–30, Rohm & Haas) as a tertiary amine catalyst. The same diamines used in Example I were added with stirring in the same amounts as set forth in Example I. The non-volatile material content of these compositions was between 58 and 60%. The Gardner-Holdt viscosity was "B." The pot life at room temperature was 18 to 24 hours.

All compositions were allowed to set for a period of 15 to 30 minutes before application. The coatings were then applied to test panels as in Example I. Again the straight chain diamines exhibited poor flow qualities, blushed in 80% humidity at 72° F., and when dried exhibited a hazy surface and opaque appearance. The epoxy compositions formulated with the secondary-alkyl diamines exhibited good flow properties, did not blush or exhibit haziness and appeared clear and had a glossy surface. Each coating was lacquer dry in 15 minutes, tack free in 2½ hours, and dried hard in 4 to 5 hours. The same tests were conducted as in Example I and results are shown in Table II.

TABLE I

| | N-sec-alkyl (C$_{7-9}$)-tri-methylene diamine | N-sec-alkyl (C$_{11-14}$)-tri-methylene diamine | N-oleyl [1] tri-methylene diamine | N-coco [2] tri-methylene diamine |
|---|---|---|---|---|
| Amount in grams | 12.12 | 17.26 | 21.89 | 17.36 |
| Pencil hardness | H | H | H | H |
| Sward hardness: | | | | |
| 24 hours | 32 | 42 | 36 | 36 |
| 1 week | 78 | 81 | 76 | 72 |
| ⅛″ Mandrel (Baked) | ([3]) | ([3]) | ([3]) | ([3]) |
| Reverse Impact (Baked), in.-lbs | 160 | 160 | 160 | 160 |

[1] Derived from commerical oleic acid containing mixed saturated and unsatuated hydrocarbon groups of from C$_{14}$–C$_{18}$, predominately 9,10-octadecenyl.
[2] Derived from coconut oil fatty acids containing unsaturated and saturated mixed chain lengths from C$_{10-18}$, predominately dodecyl and tetradecyl.
[3] Passed.

TABLE II

|  | N-sec-alkyl (C$_{7-9}$)-trimethylene diamine | N-sec-alkyl (C$_{11-14}$)-trimethylene diamine | N-oleyl trimethylene diamine | N-coco trimethylene diamine |
|---|---|---|---|---|
| Amount in grams | 12.12 | 17.26 | 21.89 | 17.36 |
| Pencil hardness: 1 week, room temp | 3H | 3H | H | H |
| Sward hardness: | | | | |
| 24 hours | 58 | 56 | 66 | 52 |
| 3 days | 80 | 80 | 82 | 72 |
| 1 week | 86 | 84 | 84 | 84 |
| ⅛″ Mandrel: 8 hours, room temp | (¹) | (¹) | (¹) | (¹) |
| Reverse Impact, in.-lbs | 160 | 160 | 160 | 160 |

¹ Passed.

Example III

A sprayable solvent coating system was formulated by making up component A containing 49.6 grams of Epon 1001, 36.53 grams of Cellosolve acetate, 11.53 grams of xylene, 12.5 grams toluene, 12.5 grams of butyl alcohol and 60 grams of titanium dioxide. Component B was formulated with 2 grams of SR-82 flow control agent and the amounts of amine and Cellosolve acetate shown in Table III.

The formulation was made by combining 8 parts of component A with 1 part of component B. The nonvolatile material content of these compositions was between 56.8 and 59.2%. The spraying viscosity held for 12 to 18 hours, and the material was still viscous after 24 hours. The pot life of the material was approximately 28 hours. Each composition was applied to test panels by spraying immediately following formulation. After spraying, the panels were allowed to set for a half hour to an hour, and then baked twenty minutes at 380° F.

Methylisobutyl ketone had no effect on standing on the coatings for a period of one hour.

Tests were conducted as set forth in Example I.

TABLE III

|  | N-sec-alkyl (C$_{7-9}$) trimethylene diamine | N-sec-alkyl (C$_{11-14}$) trimethylene diamine |
|---|---|---|
| Amount in grams | 6.01 | 8.55 |
| Cellosolve Acetate | 14.82 | 12.28 |
| Pencil hardness | 4H | 4H |
| ⅛″ Mandrel (Baked) | (¹) | (¹) |
| Reverse Impact (Baked), in.-lbs | 160 | 160 |

¹ Passed.

Example IV

A coating composition was formulated as set forth in Example I except that a solid epoxy resin having a melting point of 65–75° C., an epoxy equivalent of 425–455, viscosity of 40% in butyl carbitol Gardner-Holdt viscosity of "D" to "G," average molecular weight about 900 (Ciba 7071, Ciba Products Company, Division of Ciba Corporation), was used in place of Epon 1001. The composition had a Gardner-Holdt viscosity of "G" to "H" and pot life of 8 to 12 hours at room temperature.

Methylisobutyl ketone had no effect after 50 minutes.

The formulations containing the secondary-alkyl amines were applied to the test panels immediately after mixing and showed good flow characteristics. When cured, the coatings did not exhibit any blush, the surface was glossy, and the coating was clear in appearance.

The composition containing the straight chain diamines could not be applied until more than a half hour after mixing because of very poor flow properties. These coatings cured into a dull, opaque film.

The coatings were baked 15 minutes at 360° F. The same tests were conducted as in Example I and the results are shown in Table IV.

TABLE IV

|  | N-sec-alkyl (C$_{7-9}$)-trimethylene diamine | N-sec-alkyl (C$_{11-14}$)-trimethylene diamine | N-oleyl trimethylene diamine | N-coco trimethylene diamine |
|---|---|---|---|---|
| Amount in grams | 14.15 | 20.15 | 25.55 | 20.30 |
| Pencil hardness | H | H | H | H |
| ⅛″ Mandrel | (¹) | (¹) | (²) | (²) |
| Reverse Impact, in.-lbs | 160 | 160 | 80 | 80 |

¹ Passed.  ² Failed.

Example V

A 100% solids coating composition was formulated by adding amines in the amounts noted in Table V to a composition containing 100 grams of a liquid epoxy resin reaction product of epichlorohydrin/bisphenol A, having an epoxy equivalent of 180–195, viscosity 100–160 poises, average molecular weight about 380 (Epon 828, Shell Chemical Company), 3 grams of SR-82 and 2.5 grams of DMP-30. The N-coco trimethylene diamine was incompatible with the epoxy resin and could not be used. The compositions were allowed to stand for 30 minutes before application. The coating compositions were then applied to the test panels, allowed to dry at room temperature overnight and then baked for 20 minutes at 380° F.

The compositions containing N-oleyl trimethylene diamine appeared to exude the diamine upon curing indicating incompatability of the composition. The compositions containing secondary-alkyl diamines had good flow characteristics, no haze, no blush and cured into a glossy clear film.

The ⅛″ Mandrel test described in Example I was performed and the results are shown in Table V.

TABLE V

|  | N-sec-alkyl (C$_{7-9}$)-trimethylene diamine | N-sec-alkyl (C$_{11-14}$)-trimethylene diamine | N-oleyl trimethylene diamine | N-coco trimethylene diamine |
|---|---|---|---|---|
| Amount in grams | 33.45 | 47.71 | 60.49 | 47.95 |
| ⅛″ Mandrel | (¹) | (¹) | (¹) | (²) |

¹ Passed.  ² Incompatible.

Example VI

Solvent coating compositions were formulated using the same components as in Example V except that 1 gram of SR–82 and 3 grams of DMP–30 were used. N-coco trimethylene diamine was incompatible with the epoxy resin composition. The Gardner-Holdt viscosity of the compositions was "G" to "I" and the pot life at room temperature was about 4½ hours.

The composition containing N-oleyl trimethylene diamine required a sweat-in time of at least 90 minutes before being applied, and then the coating had poor flow and crawling around the edge of the coating was very bad, especially on glass. The cured coating was hazy and opaque.

The compositions containing N - sec - alkyl($C_{7-9}$) trimethylene diamine required a sweat-in time from 30 to 45 minutes and N-sec-alkyl($C_{11-14}$) trimethylene diamine required a sweat-in time from 60 to 90 minutes following which the coatings were applied to the test panels with good flow characteristics. The coatings containing the secondary-alkyl diamines hardened to clear glossy coatings exhibiting no blush at 80% humidity and 72° F. All coatings dried at room temperature in from 8 to 12 hours.

The Sward hardness after 24 hours of the composition containing N-sec-alkyl($C_{7-9}$) trimethylene diamine was 46, the composition containing N-sec-alkyl($C_{11-14}$) trimethylene diamine was 24, and the composition containing N-oleyl trimethylene diamine could not be tested because of the poor drawdown on glass.

Example VII

Coating compositions designed to give a high build for each application were formulated by adding the amine noted in Table VI to the epoxy composition containing 100 grams of a liquid epoxy resin reaction product of epichlorohydrin/bisphenol A containing butyl glycidal ether as a reactive diluent, epoxy equivalent 175–195, viscosity 5–7 poises, average molecular weight about 330 (Epon 815, Shell Chemical Company), 2 grams of SR–82 and 4 grams of DMP–30.

The N-coco trimethylene diamine was incompatible with the epoxy composition. The Gardner-Holdt viscosity of the compositions was "B," and the pot life at room temperature was 4 to 8 hours.

The composition containing N-oleyl trimethylene diamine required a 90 minute sweat-in time before it could be applied as a useable coating, and even then application to glass resulted in very bad crawling.

The compositions containing the secondary-alkyl diamines could be applied after 30 to 45 minutes and exhibited good flow characteristics.

The coatings applied to the test panels were baked 20 minutes at 380° F. and the tests shown in Table VI were performed.

Example VIII

Compositions similar to those of Example VII were formulated except that 1 gram of SR–82 and 3 grams of DMP–30 were used. The Gardner-Holdt viscosity, pot life and sweat-in time required were the same as Example VII.

N-coco trimethylene diamine was incompatible with the epoxy composition and no further tests could be conducted. N-oleyl trimethylene diamine showed signs of incompatibility, but did form a coating. The composition containing N-oleyl trimethylene diamine required a 90 minute sweat-in time before it could be applied. The compositions containing the secondary-alkyl diamines could be applied after 30 to 45 minutes and exhibited good flow characteristics. Coatings were applied to test panels, and dried to a hard finish in 12 hours at room temperature. The Sward hardness at 24 hours was N-sec-alkyl($C_{7-9}$) trimethylene diamine _____ 82
N-sec-alkyl($C_{11-14}$) trimethylene diamine _____ 42
N-oleyl trimethylene diamine _____ 10

The coating containing N-oleyl trimethylene diamine developed a haze and became tacky when sitting at room temperature.

Example IX

Compositions were formulated as in Example VIII except that the SR–82 flow control agent was omitted and 1.5 grams of polyvinylbutyral resin, molecular weight about 4500–5500, viscosity 10% in ethanol 175 centipoises, butyral content 88% (Butvar B–76, Monsanto Chemical Company), were used. The formulations had a Gardner-Holdt viscosity of "E" to "F" and pot life from 5 to 6 hours at room temperature.

The N-coco trimethylene diamine was incompatible with the epoxy composition.

The composition containing N-oleyl trimethylene diamine required 90 minutes sweat-in time before it could be applied as a coating. Following application, the diamine appeared to exude to the surface of the coating rendering the surface wet while the lower portions of the coating were hard, indicating the N-oleyl trimethylene diamine was incompatible.

The compositions containing the secondary-alkyl diamines could be applied after 45 minutes and exhibited good flow characteristics. The coatings appeared clear and glossy.

Sward hardness tests at 24 hours were made and the results were

N-sec-alkyl($C_{7-9}$) trimethylene diamine _____ 64
N-sec-alkyl($C_{11-14}$) trimethylene diamine _____ 36
N-oleyl trimethylene diamine _____ 10

Example X

Three compositions were formulated, denoted below as A, B, and C.

Composition A was formulated containing 100 grams of Epon 815, 50.33 grams of N-sec-alkyl($C_{11-14}$) trimethylene diamine, 1 gram of SR–82, and 2.65 grams of nonylphenol.

Composition B was formulated similar to that of composition A with the exception that dinonylphenol was substituted in place of nonylphenol.

TABLE VI

| | N-sec-alkyl ($C_{7-9}$)-trimethylene diamine | N-sec-alkyl ($C_{11-14}$)-trimethylene diamine | N-oleyl trimethylene diamine | N-coco trimethylene diamine |
|---|---|---|---|---|
| Amount in grams | 34.20 | 48.60 | 61.95 | 50.60 |
| ⅛″ Mandrel | (¹) | (¹) | (¹) | (²) |
| Reverse Impact, in.-lbs | 160 | 160 | | (²) |

¹ Passed.  ² Incompatible.

Composition C was formulated similar to that of composition A with the exception that bisphenol A was substituted in place of nonylphenol.

Each composition required a sweat-in time of about 90 minutes to obtain a good drawdown. The flow in each system was good, and there was no crawling or haze. The coatings were applied to test panels, and the panels were each baked for 20 minutes at 375° F.

The tests as described in Example I were performed and the results are shown in Table VIII.

TABLE VIII

| Compositions | A | B | C |
|---|---|---|---|
| Sward hardness: | | | |
| 24 hours | 18 | 18 | 22 |
| 1 week | 52 | 52 | 52 |
| ⅛″ Mandrel | (¹) | (¹) | (¹) |
| Reverse Impact: | | | |
| Baked, in.-lbs | 160 | 160 | 160 |
| Air dried 2 weeks at room temperature, in.-lbs | 160 | 160 | 80 |

¹ Passed.

Example XI

A high build 100% solids coating composition was formulated containing 85 grams Epon 828, 15 grams epoxy resin having an epoxy equivalent of 160, viscosity of 200 centipoises (Epi Rez 5044), 49.5 grams N-sec-alkyl($C_{11-14}$) trimethylene diamine, 8.7 grams of bisphenol A, and 3.0 grams of an unmodified urea-formaldehyde resin (Beetle 216-8, American Cyanamid) flow control agent. The composition had a Gardner-Holdt viscosity of "K" and a pot life of 1½ to 2 hours. After a sweat-in time from 15 to 25 minutes, the composition was applied to test panels and exhibited excellent flow properties. The Sward hardness after 24 hours was 26, after 3 days was 58, and after 2 weeks at room temperature was 68. The coating passed the ⅛″ Mandrel test and had a reverse impact of 160″# after 16 hours of drying at room temperature. The composition also passes these tests after 2 weeks curing at room temperature. There was no hazing or blushing of the coating as it was dried. Methylisobutyl ketone softens the coating so that it may be scratched off with a fingernail after one hour in the solvent. The coating becomes hard again after the solvent has evaporated.

The composition resulted in a clear epoxy coating exhibiting excellent flexibility and a very short sweat-in time. Such formulations are especially well suited for pipe coatings and seamless floor coatings.

Example XII

A casting composition was formulated using 68.47 grams of Epon 828 and 31.53 grams of N-sec-alkyl ($C_{11-14}$) trimethylene diamine. The composition was poured into molds and allowed to cure at room temperature for 72 hours. The castings were then baked in an oven for 1 hour at 100° F., 1 hour at 130° F., 1 hour at 150° F., and 1 hour at 180° F. Following the heat cure the Shore D hardness was 82.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A composition comprising an epoxy resin having terminal 1,2-epoxide groups and an epoxy equivalent weight of from about 100 to 2000, and a diamine having the formula

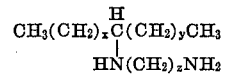

wherein $x$ and $y$ are integers having a sum of from about 3 to 19 and $z$ is an integer from 2 to 4.

2. The composition of claim 1 wherein the sum of $x$ and $y$ is from about 6 to 12 and $z$ is 3.

3. The composition of claim 1 wherein the sum of $x$ and $y$ is from about 8 to 11 and $z$ is 3.

4. The composition of claim 1 wherein said epoxy resin has an epoxy equivalent weight of from about 120 to 650.

5. The composition of claim 1 wherein said diamine is present in an amount from plus to minus 15% of one epoxy amine equivalent weight per epoxy equivalent weight.

6. The composition of claim 1 wherein said diamine is present in from plus to minus 5% of the stoichiometric amount for reaction with said epoxy.

7. A cured composition comprising the reaction product of an epoxy resin having terminal epoxide groups

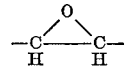

and an epoxy equivalent weight of from about 100 to 2000 and a diamine having the formula

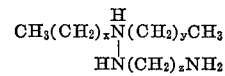

wherein $x$ and $y$ are integers having a sum of from about 3 to 19 and $z$ is an integer from 2 to 4, the amount of diamine being sufficient to react with the epoxy resin to form a hard product.

8. The composition of claim 7 wherein the sum of $x$ and $y$ is from about 6 to 12, $z$ is 3, and said resin has an epoxy equivalent weight of from about 120 to 650.

9. The composition of claim 8 wherein said epoxy resin is the reaction product of epichlorohydrin and 2,2-bis(p-hydroxyphenyl) propane.

References Cited

UNITED STATES PATENTS

| 2,902,398 | 9/1959 | Schroeder | 154—139 |
| 2,956,067 | 10/1960 | De Grotte et al. | 260—404.5 |
| 3,398,196 | 8/1968 | Miller et al. | 260—583 |
| 3,420,794 | 1/1969 | May et al. | 260—47 |

WILLIAM H. SHORT, Primary Examiner

H. SCHAIN, Assistant Examiner

U.S. Cl. X.R.

117—124, 128.4, 132, 161; 260—2, 18, 31.4, 32.8, 33.2, 33.4, 33.6, 37, 824, 834, 836, 59, 49